R. W. LOVETT.
CLAMP FOR MENDING BROKEN TROLLEY POLES AND OTHER ARTICLES.
APPLICATION FILED DEC. 4, 1908.
958,751.  Patented May 24, 1910.
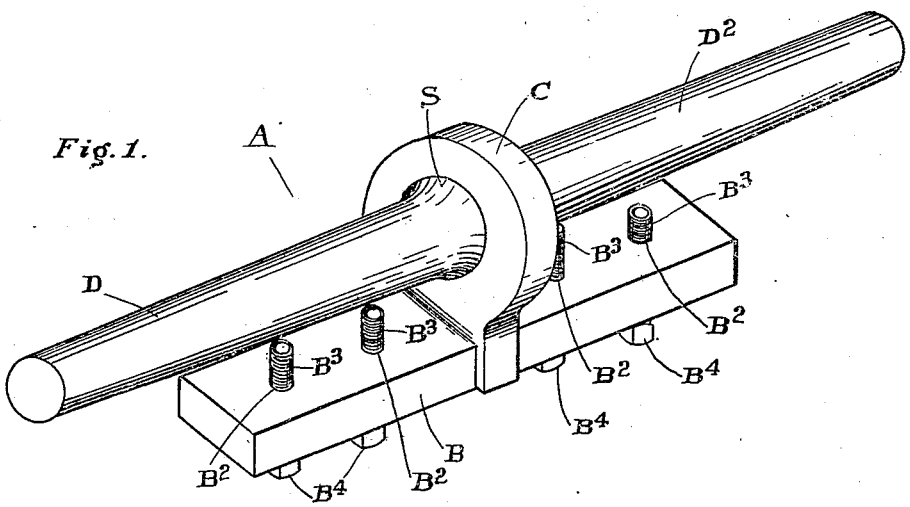
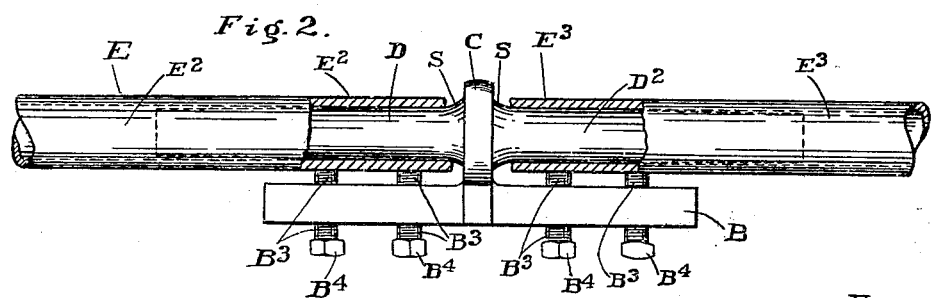
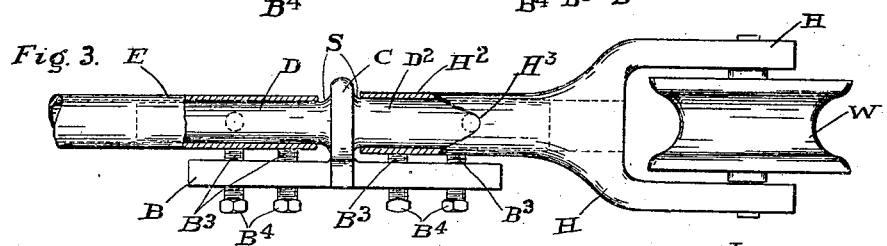
Witnesses.
R. B. Gerley
N. Smith
Inventor:
Renix W. Lovett
per Wm. Hubbell Fisher,
Attorney.

UNITED STATES PATENT OFFICE.

RENIX W. LOVETT, OF CINCINNATI, OHIO.

CLAMP FOR MENDING BROKEN TROLLEY-POLES AND OTHER ARTICLES.

958,751. Specification of Letters Patent. Patented May 24, 1910.

Application filed December 4, 1908. Serial No. 465,961.

*To all whom it may concern:*

Be it known that I, RENIX W. LOVETT, a citizen of the United States, and a resident of the city of Cincinnati, in the county of Hamilton and State of Ohio, have invented a certain new and useful Clamp for the Mending of Broken Trolley-Poles and other Articles, of which the following is a specification.

The several features of my invention and the various advantages resulting from their use conjointly or otherwise will be apparent from the following description and claims.

In the accompanying drawings making a part of this specification, and in which similar letters of reference indicate corresponding parts,—Figure 1 is a perspective view of a device embodying my invention. Fig. 2 is a side view of this device and of its application to the broken parts of a trolley pole. In this view, a portion of each adjacent end portion of the trolley pole is cut away to the better illustrate the mode in which my device holds together the broken portions of the pole. Fig. 3 is a view partly in elevation and partly in section illustrating the manner of the application of my device when it is employed to hold the end portion of the broken leg of the harp of the trolley wheel to the end portion of the adjacent pole.

I will now describe my invention in detail. The body B of the device A has holes, each marked $B^2$, and these holes are interiorly screw threaded. In each of these holes $B^2$ is a screw $B^3$. These screws are each provided with a head of any suitable shape, for enabling them to be rotated. In the present illustrative instance, the head $B^4$ is rectangular to enable a wrench to be readily applied thereto for rotating the screw. From or near the middle of this body piece or member B extends a thick piece C preferably circular, as shown. From one side of this piece C extends a long tapered rod or arm D, and from the other side of this piece C extends another long tapered rod or arm $D^2$. The axes of these rods are parallel to the length of the body piece B.

The trolley poles, as usually made, are of metal and are hollow. When a trolley pole E breaks, the rod D is pushed into the hollow interior of the broken end portion $E^2$ of the pole E, and the rod $D^2$ is pushed into the hollow interior of the broken end portion $E^3$ of the pole E. The rods D and $D^2$ are preferably tapered, and being so tapered may be forced very tightly in the respective adjacent broken ends of the pole E. This tightness of union between the said pieces of the trolley pole and the adjacent rods D and $D^2$ greatly assists in keeping the clamp from working loose and the said portions of the trolley pole from coming off from their respective rods D and $D^2$. As mentioned, each of the rods is as shown of a gently tapering shape, but near its junction with the extension piece C its diameter preferably rapidly increases so as to make the tapered swell S, substantially as shown in the figures. This swell S insures a tight junction of the trolley pole and the rod in proximity to the piece C. After the said rods D and $D^2$ have been introduced into the respective adjacent broken portions $E^2$ and $E^3$ of the trolley, substantially as indicated in Fig. 2, the four screws $B^3$ are advanced and are screwed tightly against the end portions of the parts $E^2$ and $E^3$ of the pole, as shown in Fig. 2.

This clamp thus applied mends the broken trolley pole E, and imparts to this pole the necessary stiffness to make it practically useful. The clamp also prevents that portion of the trolley pole that is next to the trolley wheel W from turning sidewise. The trolley wheel is therefore held in its proper working position.

This clamping device can be used on any part of the pole just as far as the pole is hollow. It can also be employed to furnish means for the connection of the pole to the trolley wheel W, when the shank $H^2$ of the harp H of the trolley wheel is partially broken. This mode of employment of the clamp is illustrated in Fig. 3. There one rod D of the clamp is inserted in the adjacent hollow end of the trolley pole, and the other rod $D^2$ is inserted into the partially broken hollow shank $H^2$ of the harp or trolley wheel support H. The screws $B^3$, $B^4$ are respectively screwed forward and two of them bear against the trolley pole E, and the other two bear against the harp shank $H^2$ and hold these parts so pressed tightly clamped between the body B and the adjacent rod D or $D^2$ as the case may be. The harp is thereby firmly secured to the trolley pole and held so that it cannot rotate on the rod $D^2$.

It is found in practice that in the case of the trolley harp leg, the break therein usually occurs at the place where are located the rivet holes H³ of the leg, which holes receive the rivet that extends through the said harp leg and through the trolley pole. In fact, the break more often occurs here in the trolley harp leg, and in the trolley pole where said rivet enters said pole, than at any other place on the trolley pole or leg. When the said rivet breaks, the end of the leg of the harp will pull right off from the trolley pole.

In general, it is to be noted that my invention become of use under four important conditions: First,—where the trolley pole breaks in two. Then my clamp can be successfully employed to unite the two. Secondly,—where the trolley pole is simply pulled out from the leg of the trolley harp. In such a case, my improved clamp can be used to unite them. Thirdly,—where a portion of the trolley pole is broken at its junction with the leg of the trolley harp, the said leg remaining intact, my invention can unite them. Fourthly,—where a portion of the leg of the trolley harp is broken away, substantially as shown in Fig. 3, and the adjacent end portion of the trolley pole is or is not broken, my invention can be used to unite the leg of the trolley harp and the adjacent end portion of the trolley pole.

Of course, the clamp can be readily removed by loosening the screws and withdrawing the rods D, D² from the adjacent parts of the broken trolley pole, or from the part of the trolley pole and the leg of the trolley harp, as the case may be.

The advantages of being able to quickly and effectively unite the broken portions of a trolley pole and to unite the pole to the leg of the trolley harp, in case of separation or in case of the breakage of one or the other or of both, at their meeting portions, are very great.

Thus detention to travelers, to the United States mail and to other things conveyed is to a great extent obviated. Delays which involve much time of employees are obviated.

The carriage of new trolley poles to the place of the accident, in the breakage of the pole, etc., or the hauling of a car crippled by the breaking of its trolley pole or harp to the barn or other place of repair,—all these are obviated.

The implement of my invention herein described can be readily carried on the car in readiness for use.

This clamp is primarily designed for use in connection with broken trolley poles and with broken shanks of the harp of the trolley wheel, but it is applicable to all cases of broken bars or rods which are hollow, and which are capable of receiving into the end portions of the broken parts rods substantially such as are shown in the clamp. I therefore claim the application of my improved clamp to all of such constructions and invoke the protection of the patent therefor.

What I claim as new, and of my invention and desire to secure by Letters Patent, is:—

1. A clamp, consisting of a body piece, an extension projecting from the body piece and provided with oppositely extending rods respectively located at a distance from the body piece, said body piece provided with screws adapted to be advanced against the sides of the said rods, substantially as and for the purposes specified.

2. A clamp, consisting of a body piece, an extension therefrom, cylindrical rods which taper and are connected at their larger ends to the extension, each rod provided next to the extension with an increased taper, the body piece being located at a distance from the said rods and screws extending through the said body piece and adapted to bear against the said rods substantially as and for the purposes specified.

RENIX W. LOVETT.

Attest:
STARBUCK SMITH,
K. SMITH.